US012670055B2

(12) United States Patent
Huang et al.

(10) Patent No.: US 12,670,055 B2
(45) Date of Patent: \*Jun. 30, 2026

(54) ACCESS CONSISTENCY IN HIGH-AVAILABILITY DATABASES

(71) Applicant: PayPal, Inc., San Jose, CA (US)

(72) Inventors: Zhe Huang, Shanghai (CN); Jia Mei, Shanghai (CN); Xin Li, Shanghai (CN); Ying Yue, Nanjing (CN); Chaoyi Chen, Shanghai (CN)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/779,422

(22) Filed: Jul. 22, 2024

(65) Prior Publication Data

US 2024/0411632 A1 Dec. 12, 2024

Related U.S. Application Data

(63) Continuation of application No. 18/203,388, filed on May 30, 2023, now Pat. No. 12,086,020, which is a
(Continued)

(30) Foreign Application Priority Data

Oct. 21, 2020 (WO) ................ PCT/CN2020/122348

(51) Int. Cl.
*G06F 11/00* (2006.01)
*G06F 11/07* (2006.01)
(Continued)

(52) U.S. Cl.
CPC ...... *G06F 11/0772* (2013.01); *G06F 11/0757* (2013.01); *G06F 11/076* (2013.01);
(Continued)

(58) Field of Classification Search
CPC ............... G06F 11/0757; G06F 11/076; G06F 11/2082; G06F 11/2069; G06F 11/2094; G06F 2201/80
See application file for complete search history.

(56) References Cited

U.S. PATENT DOCUMENTS 8,856,583 B1 10/2014 Visser et al.
9,729,468 B2 8/2017 Jaisinghani
(Continued)

FOREIGN PATENT DOCUMENTS

CN 104516966 A 4/2015
CN 108599996 A 9/2018
CN 108958991 A 12/2018

OTHER PUBLICATIONS

International Preliminary Report on Patentability for Application No. PCT/CN2020/122348, mailed on May 4, 2023, 6 pages.
(Continued)

*Primary Examiner* — Marc Duncan
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed relating to maintaining a high availability (HA) database. In some embodiments, a computer system receives, from a plurality of host computers, a plurality of requests to access data stored in a database implemented using a plurality of clusters. In some embodiments, the computer system responds to the plurality of requests by accessing data stored in an active cluster. The computer system may then determine, based on the responding, health information for ones of the plurality of clusters, wherein the health information is generated based on real-time traffic for the database. In some embodiments, the computer system determines, based on the health information, whether to switch from accessing the active cluster to
(Continued)

Method
400

Receive, from a plurality of host computers, a plurality of requests to access data stored in a database implemented using a plurality of clusters.
410

Respond to the plurality of requests by accessing data stored in an active cluster.
420

Determine, based on the responding, health information for ones of the plurality of clusters, where the health information is generated based on real-time traffic for the database.
430

Determine, based on the health information, whether to switch from accessing the active cluster to accessing a backup cluster.
440

Store, in respective clusters of the database, a changeover decision generated based on the determining.
450 accessing a backup cluster. In some embodiments, the computer system stores, in respective clusters of the database, a changeover decision generated based on the determining.

20 Claims, 6 Drawing Sheets

Related U.S. Application Data continuation of application No. 17/404,471, filed on Aug. 17, 2021, now Pat. No. 11,704,182.

(51) Int. Cl.

| | | |
|---|---|---|
| *G06F 11/1446* | (2026.01) | |
| *G06F 11/20* | (2006.01) | |
| *G06F 11/30* | (2006.01) | |

(52) U.S. Cl.

CPC ...... *G06F 11/1451* (2013.01); *G06F 11/1464* (2013.01); *G06F 11/1469* (2013.01); *G06F 11/2069* (2013.01); *G06F 11/2082* (2013.01); *G06F 11/3034* (2013.01); *G06F 2201/80* (2013.01)

(56) References Cited

U.S. PATENT DOCUMENTS

| | | | |
|---|---|---|---|
| 10,248,691 | B2 | 4/2019 | Das et al. |
| 11,704,182 | B2 * | 7/2023 | Huang ................ G06F 11/0772 |
| | | | 714/48 |
| 11,921,699 | B1 * | 3/2024 | Govindagowda ....... G06F 16/27 |
| 12,086,020 | B2 * | 9/2024 | Huang ................ G06F 11/0772 |
| 2012/0233496 | A1 | 9/2012 | Gil et al. |
| 2012/0254669 | A1 * | 10/2012 | Xia ..................... G06F 11/0709 |
| | | | 714/E11.202 |
| 2015/0019494 | A1 | 1/2015 | Griffith et al. |
| 2016/0188426 | A1 | 6/2016 | Kousha et al. |
| 2017/0220431 | A1 | 8/2017 | Joshi et al. |
| 2022/0121510 | A1 | 4/2022 | Huang et al. |
| 2022/0188184 | A1 | 6/2022 | Robison et al. |

OTHER PUBLICATIONS

International Search Report and Written Opinion for Application No. PCT/CN2020/122348, mailed on Jul. 15, 2021, 9 pages.

Redis, "Guidelines for Redis Clients With Support for Redis Sentinel," Retrieved from the internet: https://redis.io/topics/sentinel-clients, on Oct. 26, 2020, 5 pages.

* cited by examiner

*300*

Computer System
110

*Health Ballots 302*

Database 160

Active Cluster 330A

*Active Ballot Results 310A*

*Backup Ballot Results 320A*

Backup Cluster 330B

*Active Ballot Results 310B*

*Backup Ballot Results 320B*

*Backup Cluster Ballot Results 320A*

Key 402

Host Name
350A

⋮

Host Name
350N

Value 404

*Timestamp + Health Vote 352A*

⋮

*Timestamp + Health Vote 352N*

*Method*
*400*

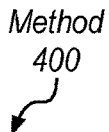

Receive, from a plurality of host computers, a plurality of requests to access data stored in a database implemented using a plurality of clusters.
410

Respond to the plurality of requests by accessing data stored in an active cluster.
420

Determine, based on the responding, health information for ones of the plurality of clusters, where the health information is generated based on real-time traffic for the database.
430

Determine, based on the health information, whether to switch from accessing the active cluster to accessing a backup cluster.
440

Store, in respective clusters of the database, a changeover decision generated based on the determining.
450

*Fig. 4*

*Method*
*500*

Access data stored in a database implemented using a plurality of clusters.
510

Receive, from the database, responses indicating whether accessing data stored in clusters of the database was successful.
520

Determine, based on the responses, health values for respective database accesses, where the health values are usable by a gateway device to generate health information for ones of the plurality of clusters, where the health information is usable by one or more access host computers maintained by the gateway device to determine whether to switch from accessing an active cluster of the database to accessing a backup cluster of the database.
530

*Fig. 5*

ACCESS CONSISTENCY IN HIGH-AVAILABILITY DATABASES

RELATED APPLICATIONS

The present application is a continuation of U.S. patent application Ser. No. 18/203,388, filed May 30, 2023, which is a continuation of U.S. patent application Ser. No. 17/404, 471, filed Aug. 17, 2021, now U.S. Pat. No. 11,704,182, which claims priority to PCT Appl. No. PCT/CN2020/ 122348, filed Oct. 21, 2020, which are incorporated by reference herein in their entirety.

BACKGROUND

Technical Field

This disclosure relates generally to database systems, and, more specifically, to techniques for maintaining multiple database clusters, e.g., for high availability.

Description of the Related Art

Databases that include multiple clusters provide high availability for computers which access these databases. For example, two clusters may contain exact copies of the same data. One of these clusters may fail due to health issues, which causes accesses to this cluster to fail. As a result, these clusters may no longer be in sync (i.e. contain the same data). This phenomenon may be referred to as a "split-brain" scenario. This scenario arises when two different data sets within the database that were originally synced lose the ability to sync due to one of the data sets becoming inaccessible. Because one of the data sets is inaccessible, various data manipulation language (DML) operations being sent to the corresponding objects in both data sets (e.g., a primary cluster and a backup cluster) of the database will only be processed for the healthy data set.

BRIEF DESCRIPTION OF THE DRAWINGS

FIG. 4 is a flow diagram illustrating a method for generating a changeover decision for a database implemented using multiple clusters, according to some embodiments.

FIG. 5 is a flow diagram illustrating a method for generating health information usable to determine whether to switch from accessing an active cluster to accessing a backup cluster, according to some embodiments.

DETAILED DESCRIPTION

Figure 1:
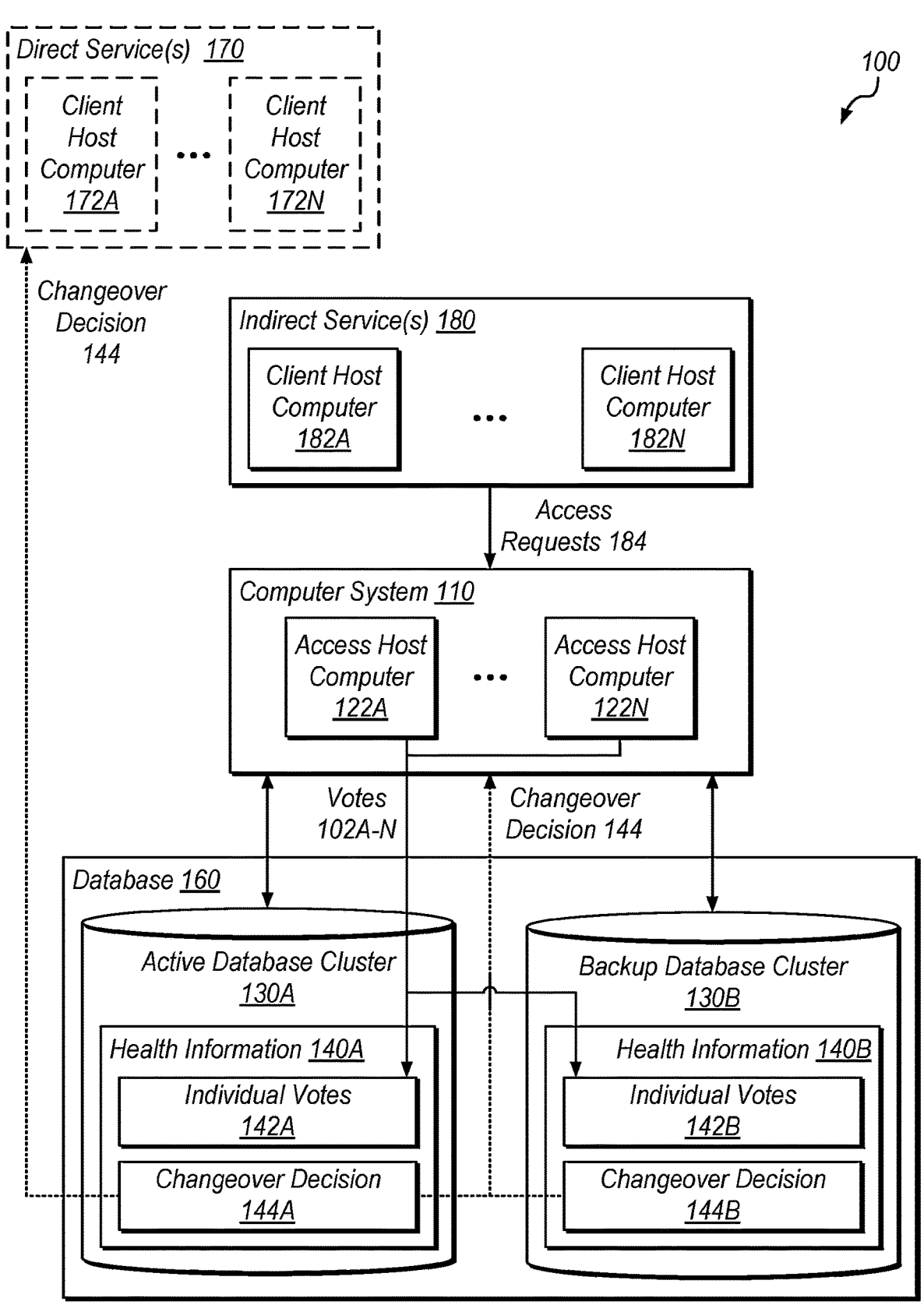
FIG. 1 is a block diagram illustrating an example database system configured to manage a database implemented using multiple clusters, according to some embodiments.

In order to synchronize database clusters, the health of these clusters must be determined. Traditional techniques for identifying health information for clusters include implementing an external coordinator such as the sentinel mechanism used in in-memory data structures such as the Redis key-value store. This sentinel mechanism periodically sends a heartbeat to respective clusters of a database. Another example of an external coordinator includes APACHE's ZooKeeper. Heartbeats sent by an external coordinator are simple pulse signals used to check the health status of clusters in the database. For example, these heartbeats indicate whether a database cluster is alive or not. Based on this information, the sentinel votes on whether a given cluster is healthy or not. This type of health check, however, does not reflect real-time traffic between host computers and a database. For example, in some cases, a database cluster may be alive, but is unable to properly serve requests from client computers. In such situations, the sentinel would report that this database cluster is healthy, even though client requests to this cluster fail or this cluster would not provide adequate response times (and thus may timeout).

Techniques are disclosed for providing a consistent health voting system that does not involve an external coordinator. In particular, the disclosed techniques allow access host computers in a pool to cast ballots for clusters in a non-relational database based on real-time traffic between the client host computers and the database rather than a simple alive/not alive pulse check, such as a heartbeat. Note that an access host computer provides access to one or more client host computers to the database by maintaining a connection to the database. Monitoring real-world traffic is possible due to the disclosed health voting system being built within a layer of the database system that provides access to the database (e.g., a data access layer) that maintains a pool of access host computers. For example, a particular access host computer may attempt a plurality of database operations on data stored in an active cluster of the database. Based on the results of these database operations (e.g., a number of failures, timeouts, and successes), the access host computer casts a ballot specifying the health of this active cluster. The disclosed system then makes a changeover decision for this particular cluster based on ballots from a plurality of host computers. For example, if ballots from a majority of the access host computers included in the pool indicate that the active cluster is an unhealthy cluster, then the disclosed system will store a changeover decision in respective clusters of the database indicating to switch from the active (unhealthy) cluster to a standby (healthy) cluster. Storing the changeover decision in both active and standby clusters of the database allows host computers to access the changeover decision even in situations in which only one of these clusters is alive.

The disclosed techniques may advantageously provide high availability to various client host computers attempting to access a distributed database while preventing inconsistencies in various clusters of the distributed database. As discussed above, a high availability database may be one that aims to maintain a predetermined level of operation performance (e.g., the database will generally be available to computer systems attempting to access the database). Preventing inconsistencies between the clusters may in turn improve the overall performance of the database system, by providing accurate and consistent data to requesting systems. In addition, storage of health information for the distributed database in multiple clusters of the database may ensure that a changeover decision is available to host computers even in situations in which one or more database clusters are down. For example, if an active cluster is currently down, host computers will be able to access the changeover decision stored in a standby cluster and, as a result, the host computers will know to switch to using the standby cluster instead of the active cluster. Because a changeover decision generated using the disclosed techniques is based on real-time traffic of the database, this decision may provide a more accurate representation of the health of clusters in a distributed database relative to traditional health techniques (e.g., those using a heartbeat).

Example Database System

FIG. 1 is a block diagram illustrating an example database system configured to manage a database implemented using multiple clusters. In the illustrated embodiment, system 100 includes a computer system 110, one or more indirect client services 180, which in turn include client host computers 182A-182N, and a database 160, which in turn includes an active database cluster 130A and a backup database cluster 130B. In some embodiments, system 100 includes one or more direct client services 170.

Computer system 110, in the illustrated embodiment, communicates with various client host computers 182 included in indirect service(s) 180 to provide access to data stored in database 160. Computer system 110 may receive various access requests 184 from one or more client host computers 182 included in one or more indirect client services 180. These requests are database queries. Based on these requests, computer system 110 may utilize various database connections maintained by access host computers 122 included in a pool of access host computers to propagate database operations to database 160. In some embodiments, computer system 110 is a data access service that acts as a data access layer (DAL). Client services (e.g., services 180) connect to the data access service to access database 160. Note that client host computers 182 submit requests to access database 160, while access host computers 122 maintain connections to the database in order to provide access to client host computers 182. Computer system 110 maintains this pool of access host computers 122 based on a number of database connections necessary to satisfy database access requests received from various client services. This pool may include hundreds of access host computers, which provide a data access service to various client services. Computer system 110 may be referred to as a distributed data access service.

As used herein, the term "data access layer" is intended to be construed according to its well-understood meaning, which includes computer software which provides simplified access to various data stored in persistent storage, such as a database. In some embodiments, the data access layer provides access to various non-relational databases. For example, the data access layer may provide access to a not only structured query language (NoSQL) database. In other embodiments, the data access layer provides access to relational databases. The disclosed techniques may be implemented for any of various types of databases. As discussed below with reference to FIG. 2, the computer system 110 may be a gateway device which provides various client host computers with access to database clusters included in database 160. In some embodiments, one or more direct client services 170 including various client host computers 172 may access database 160 directly (i.e., without connecting to computer system 110).

Indirect client service(s) 180 may include a plurality of client host computers 182A-182N which access database 160 via computer system 110. These service(s) 180 may include various virtual host computers which have access to the same set of physical servers and storage resources. In some situations, client host computers include a user interface allowing individuals to utilize these computers for various client applications (e.g., which access data stored in the database 160).

Database 160, in the illustrated embodiment, includes two different database clusters storing duplicate sets of data: active database cluster 130A and backup database cluster 130B. In some embodiments, database 160 is a non-relational database. In some embodiments, database 160 includes a set of active database clusters and a set of backup database clusters. As used herein, the term "database cluster" is intended to be construed according to its well-understood meaning in the context of database systems, which includes a collection of database nodes. These database nodes may be replicas of one another, in which case each node acts as a backup of the data stored in the other nodes. In some embodiments, database clusters 130A and 130B are implemented within AEROSPIKE, which is an in-memory open source NoSQL database.

The data center at which database 160 is located may be a facility that includes various hardware storage systems for storing, processing, and disseminating data to different computer systems included in a given computer network. In some embodiments, multiple data centers at different physical locations may store duplicate data for an entity (e.g., a business). For example, computer system 110 may facilitate access to a data center in Salt Lake City, Utah, while another computer system facilitates access to a data center in Las Vegas, Nevada. In addition to the redundancy provided by multiple data centers spread across different physical locations, implementation of the two clusters 130 within a given data center provides a redundancy necessary for a high-availability (HA) database. As discussed above, in various situations, active cluster 130A may become out of sync with backup cluster 130B causing inconsistencies between the data stored in these two clusters. The disclosed techniques provide a consistent high availability mechanism to ensure that clusters across data centers have the same data. For example, in some embodiments, cluster 130A is located in the Utah data center, while cluster 130B is located in the Nevada data center.

In order to maintain consistency between the two database clusters 130 implemented within database 160, computer system 110 collects votes 102A-102N from access host computers 122 and determines whether one or more clusters in the database 160 currently include inferior characteristics (e.g., are unhealthy due to failure). Such votes may be provided by access host computers 122 based on real-time database traffic. For example, client host computers 182 send requests to computer system 110 to access information stored in database 160. Access host computers 122 access clusters in database 160 and provide responses to client host computers 182 accordingly. Based on responses to these requests (e.g., success, failure, timeout, etc.), access host computers 122 generate health votes specifying whether various clusters in the database are healthy or not.

Once a cluster is determined to be unhealthy, this cluster should no longer be accessed. An unhealthy cluster may be one that is no longer synced up with its duplicate cluster (e.g., database cluster 130A no longer includes identical data to database cluster 130B). Under normal operating conditions, corresponding clusters (e.g., clusters 130A and 130B) stored in the database are intended to store the same information. In database systems in which health information for clusters is not available or maintained (e.g., there is no sentinel checking the health of clusters), database clusters may become unhealthy due to different access host computers accessing both the active and backup clusters (instead of all host computers accessing the same cluster, e.g., active cluster 130A, within a given timeframe). Health monitoring systems that use sentinels, for example, attempt to alleviate this problem by sending pulses to the database periodically to determine whether clusters are still healthy. Based on these checks, the sentinels may provide health information instructing all host computers to access a healthy set of clusters. Such sentinels, however, do not provide health information based on real-time database traffic, which may cause the information provided by these sentinels to be inaccurate. The disclosed health voting techniques attempt to solve this problem by determining whether to switch to backup clusters based on real-time database traffic.

Computer system 110 generates health information 140 based on votes 102 collected from various access host computers 122. These votes may be referred to herein as health votes or ballots. Computer system 110 collects votes from access host computers 122 and generates a changeover decision. This decision may be based on a quorum of the votes, for example. In particular, when a quorum (i.e., a majority) of votes is available (a majority of the access host computers have provided health votes), computer system 110 generates a changeover decision based on these votes. For example, a quorum may include at least 50% of access host computers maintained by computer system 110. Then, computer system 110 stores copies of this decision 144 along with individual health votes 142 in active cluster 130A and backup cluster 130B.

This changeover decision 144 may specify whether host computers should switch from accessing cluster 130A to accessing backup cluster 130B. This changeover decision 144 may also be referred to as a failover decision. In the event of a changeover decision, a normally accessed active cluster that is currently serving live traffic will no longer be accessed and, instead, all live traffic will be switched to the backup (or standby) cluster. The active cluster may be referred to as a primary cluster, while the backup cluster may be referred to as a local data recovery cluster. After accessing the changeover decision 144, access host computers 122 implement a switch action thread. This thread is a smallest sequence of programmed instructions that can be managed independently by a computer operating system. This switch action thread performs a changeover when an active cluster is indicated as out of service by the changeover decision 144. This switch action thread is discussed in further detail below with reference to FIG. 3.

Storage of the health information 140 in both an active cluster as well as a backup cluster of the database may advantageously guarantee that this information is available even in situations in which one of the clusters is unavailable. As discussed above, generating health information based on real world database traffic provides a more accurate representation of the health of various database clusters. As a result, the changeover decision generated based on this health information will accurately reflect the current state of clusters in the database. Because the disclosed database health system is implemented via two independent database clusters (e.g., an active cluster and a backup cluster), no additional infrastructure or external coordinator such as a ZooKeeper is needed, providing for an easily executable and maintainable system.

As noted above, in some situations, various direct client services 170 may also access data stored in database 160. These service(s) 170 may access database 160 directly. That is, while indirect client services 180 access database 160 via computer system 110, client services 170 access the database directly. While service(s) 170 may include various client host computers 172, the number of host computers included in these services is often insignificant in comparison with the number of host computers included in indirect service(s) 180. Consequently, the host computers 172 included in one or more service(s) 170 do not participate in voting on the health of clusters implemented in the database. These client service(s) 170 simply read the changeover decision 144 directly from the database 160 and perform future database accesses according to the changeover decision. For example, service(s) 170 alter which cluster they access for future queries based on this decision. Therefore, client services fall into two categories: those that access database 160 via the data access layer (i.e., computer system 110) and those that access the database directly. The former participate in the disclosed health voting and the data access layer handle votes and generation of a changeover decision in a manner that is transparent to these client services, while the latter do not vote and simply read the changeover decision from the database once it has been generated.

Example Failure Ratio Calculation

Figure 2:
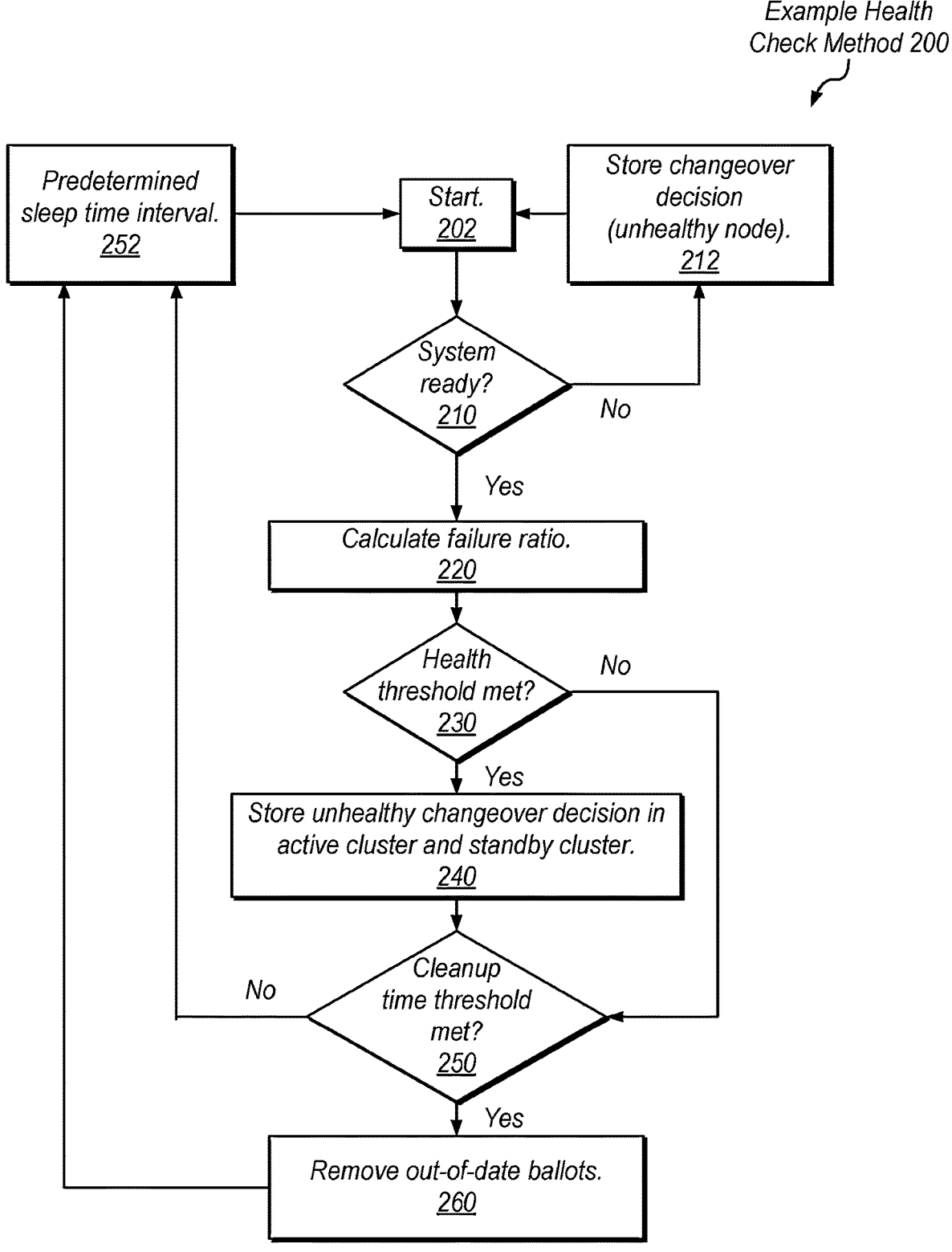
FIG. 2 is a flow diagram illustrating a method for calculating a failure ratio for one or more clusters in the database, according to some embodiments.

FIG. 2 is a flow diagram illustrating a method 200 for performing a health check for one or more clusters in the database. The method shown in FIG. 2 may be used in conjunction with any of the computer circuitry, systems, devices, elements, or components disclosed herein, among other devices. For example, computer system 110 may perform the method shown in FIG. 2. In various embodiments, some of the method elements shown may be performed concurrently, in a different order than shown, or may be omitted. Additional method elements may also be performed as desired.

At element 202, the method starts. At element 210, a computer system determines whether the database system is ready. For example, if an indicator of a set of database clusters (e.g., the active set of clusters) that indicates whether these clusters are healthy has been removed, then the computer system may automatically determine that the current cluster should no longer be access (e.g., is unhealthy). If, however, the indicator specifies that this cluster is ready for access (e.g., healthy), at 220 the computer system initiates a failure ratio calculation for various clusters in the database (e.g., database 160). For example, the failure ratio may be calculated for both the active cluster and the backup cluster, regardless of which cluster is currently being accessed.

A system ready indicator is a flag of the database whose value can be manually set or removed altogether. In the disclosed system, this flag is a record that can be inserted into a database cluster. Based on this record existing in a cluster, the computer system 110 will determine the value of the record prior to taking further action in a health check. This flag provides the ability to manually changeover to a backup cluster even if the active cluster is still healthy (according to a health check performed by computer system 110). This implementation may be used to perform maintenance on the active cluster, such as upgrading a software version or replacing out-of-date hardware. After performing such operations, the system may need to reboot the active cluster and, therefore, this cluster should not be accessed during the reboot. In order to perform such operations and reboot the active cluster, for example, the disclosed system removes a system ready flag from the active cluster, causing computer system 110 to generate a changeover decision indicating to changeover from accessing the active cluster to accessing the backup cluster.

Access host computers 122 may each calculate a failure ratio for various clusters in the database by attempting access various clusters in the database. Based on these attempts for a given cluster indicating failure, success, or timeout, a given access host computer 122 divides a number of timeout and failure responses by a total number of access attempts for this cluster. Success indicators for these access attempts are provided in real-time according to the availability of data stored in the database 160. A timeout may indicate that an access to a given database cluster is taking longer than an allowed amount of time to process, for example.

If the calculated failure ratio is greater than a certain amount, then a given access host computer might cast an unhealthy vote for this cluster. For example, if a greater number of accesses to a given cluster return a failure than a success, then this cluster may be unhealthy. Note that each access host computer may calculate failure ratios and, based on these ratios, cast health votes for various clusters in the database. For example, access host computer 122A may cast a health vote for each of database clusters 130A and 130B based on querying information stored in these clusters. Health votes are cast within a given time interval based on accesses to the database within that time interval. For example, the health check process 200 may be initiated every two minutes, providing access host computers with plenty of time to submit a plurality of queries to the database for accessing data stored in various clusters in the database.

At 230, the computer system determines whether a number of unhealthy votes from various access host computers for an active database cluster satisfies a health threshold. If, for example, the number of unhealthy votes for the active cluster is greater than or equal to 50% of the total number of votes received from the access host computers, then the computer system will generate a changeover decision indicating that the active cluster is unhealthy. The changeover decision is then stored by the computer system in both the active and standby clusters at element 240. If the number of unhealthy votes for the active cluster does not satisfy the health threshold, then the changeover decision is healthy and the method proceeds to element 250. In some embodiments, the changeover decision is updated to indicate healthy. For example, in situations in which the previous health check resulted in an unhealthy active cluster, a current health check indicating healthy may cause the changeover decision to be updated accordingly.

At 250, the computer system determines whether a cleanup time threshold has been met. The cleanup time threshold specifies an amount of time that may pass before the disclosed system removes obsolete ballots from the health information. These ballots may be considered obsolete when access host computers associated with these ballots are no longer active (e.g., database connections associated with these computers are no longer maintained in the pool). This determination is made by subtracting a ballot timestamp stored in the database that was generated by a given access host computer from a current time. If this value is greater than the cleanup time threshold, then the computer system removes ballots of this access host computer from health information.

The predetermined sleep interval may be selected based on the volume of database traffic. For example, if the selected interval is too short, there may be too little database traffic observed during the interval and, therefore the failure ratio calculated based on this traffic may not accurately reflect the health of a database cluster (e.g., the ratio may be impacted by some random factor, such as network jitter). In contrast, if the selected interval is too long, ballot collection for determining a changeover decision may take more than a desirable amount of time. The cleanup time threshold may be two times a predetermined sleep interval in some instances. That is, the computer system may go through upwards of three iterations of health checking before determining whether access host computers have been removed from pool 120 (and, therefore, are no longer participating in the health voting). This is done so that obsolete ballots are not considered when generating a changeover decision.

At 252, the computer system waits for a predetermined time interval before beginning the health check process again. This time interval may be 60 seconds, for example. Health check 200 may be completed for a database periodically to ensure that the appropriate clusters within the database are being accessed.

Note that various examples herein generate changeover decisions for example non-relational databases, but these examples are discussed for purposes of explanation and are not intended to limit the scope of the present disclosure. In other embodiments, any of various types of databases may be implemented.

Example Health Information Storage

Figure 3:
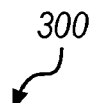
FIG. 3 is a block diagram illustrating example health information stored in clusters of the database, according to some embodiments.

FIG. 3 is a block diagram illustrating example health information stored in clusters of the database. In the illustrated embodiment, system 300 includes computer system 110 and database 160, which in turn includes both active and backup clusters 330 with copies of ballot results generated from the example health check method discussed above with reference to FIG. 2. In some embodiments, the copies of ballot results stored in both the active and backup clusters 330 include ballot results generated based on health votes provided by various access host computers 122 accessing the database 160.

Computer system 110, in the illustrated embodiment, stores health ballots 302 for both active and backup clusters in respective clusters of the database 160. For example, a copy of the ballot results 310A for an active cluster and a copy of the ballot results 320A for a backup cluster is stored in the active cluster 330A, while a copy of the ballot results 310B for the active cluster and a copy of the ballot results 320B for the backup cluster is also stored in the backup cluster 330B. This storage configuration provides access to the health information even in situations in which either the active or the backup clusters are unavailable.

In the illustrated embodiment, a blown-up version of the ballot results 320A for the backup cluster 330B is shown. These ballot results are stored in a key-value configuration with the hostname of each host computer being stored in the key field 402 and a timestamp (e.g., the time at which this ballot was cast) and a health vote (e.g., a binary value where 0 is unhealthy and 1 is healthy) stored in the value field 404 in the active cluster of the database. In this way, a latest ballot cast by a given access host computer for the backup cluster is stored in the database in key-value form. That is, a ballot cast by a given access host computer may indicate for an active cluster whether a majority of the votes specify "healthy." Ballot results 310A and 310B provided by access host computers for the active cluster 330A are stored in a similar manner in database 160. In other embodiments, a ballot cast by a given access host computer indicates whether a particular cluster is healthy or unhealthy. Each access host computer may cast a ballot for each of the active and backup clusters, which are then stored in database 160 in key-value form.

In some embodiments, access host computers 122 included in the pool of computer system 110 read a changeover decision 144 from the database 160 periodically. For example, every ten seconds, a switch action thread may be executed by each host computer to determine whether an action is necessary to change from accessing an active cluster to a backup cluster or vice versa. This switch action thread is a light-weight thread that is run in a short periodic in order to allow the disclosed system to react to a change-over decision quickly. In the example in which the period is ten second, the switch action thread will check the change-over decision every ten seconds and take action accordingly. So, host computers would take action 10 seconds after the changeover decision is stored in the database clusters.

Example Methods

FIG. 4 is a flow diagram illustrating a method for generating a changeover decision for a database implemented using multiple sets of clusters, according to some embodiments. The method shown in FIG. 4 may be used in conjunction with any of the computer circuitry, systems, devices, elements, or components disclosed herein, among other devices. For example, computer system 110 may perform the method shown in FIG. 4. In various embodiments, some of the method elements shown may be performed concurrently, in a different order than shown, or may be omitted. Additional method elements may also be performed as desired.

At 410, in the illustrated embodiment, a computer system receives, from a plurality of host computers, a plurality of requests to access data stored in a database implemented using a plurality of clusters. In some embodiments, the database is a non-relational database. In some embodiments, the active cluster and the backup cluster include redundant data. In some embodiments, the computer system is a gatekeeper for the non-relational database such that it facilitates communication between the plurality of host computers and the database. In some embodiments, the computer system receives requests from one or more client host computers included in client services. For example, computer system 110 may receive requests to access database 160 from client host computers 182 in one or more services 180.

At 420, the computer system responds to the plurality of requests by accessing data stored in an active cluster. In some embodiments, the computer system accesses the data using one or more access host computers maintained in a pool of host computers. These access host computers maintain database connections.

At 430, the computer system determines, based on the responding, health information for ones of the plurality of clusters, where the health information is generated based on real-time traffic for the database. In some embodiments, determining the health information includes determining whether one or more database accesses were successful, and wherein the health information indicates inferior characteristics of the active cluster.

In some embodiments, the health information is generated by access host computers by sending, to the database via the computer system, a plurality of requests for data. In some embodiments, the host computers then determine, based on success of database accesses, health values for respective database accesses. In some embodiments, the host computers then calculate, based on the health values, failure ratios for one or more clusters in the database. For example, if a given cluster has 3 failures and 1 timeout in 1000 database accesses to this cluster, then the failure ratio for this cluster would be 4/1000. In some embodiments, the health information is further generated by determining whether the failure ratios calculated for various clusters satisfy a health threshold, where the health information indicates whether the various clusters in the database are healthy based on the determining. Therefore, for a health threshold of 60%, the cluster with a 4/1000 failure ratio would be considered healthy.

At 440, the computer system determines, based on the health information, whether to switch from accessing the active cluster to accessing a backup cluster. The result of this determination may be referred to as a changeover decision. For example, if more than 50% of the clusters in the set of active clusters are unhealthy (based on the failure ratios calculated at 430), then the computer system determines that host computers should switch to accessing the backup clusters instead of the active clusters. In some embodiments, the set of active clusters and the set of backup clusters include redundant data. In some embodiments, the computer system periodically receives, from access host computers included in a pool of access host computers configured to respond to the plurality of requests, updated health information. The updated health information is generated based on changes in real-time traffic for the database. In some embodiments, the computer system updates, based on the updated health information, the changeover decision.

In some embodiments, the computer system periodically determines, based on a cleanup time threshold, whether one or more access host computers have been removed from the pool. In some embodiments, the computer system removes, from the health information, one or more health ballets associated with access host computers that have been removed from the pool. For example, if an access host computer is no longer active within the pool of access host computers, then old health votes cast by this access host computer should be removed from the pool as these votes have become obsolete. In some embodiments, the cleanup time threshold is three minutes.

At 450, the computer system stores, in respective clusters of the database, a changeover decision generated based on the determining. This changeover decision is accessible to various access host computers 122 in determining which set of clusters in the database to access for future database requests. In some embodiments, the stored changeover decision is accessible to one or more access host computers for determining whether to access the active cluster of the backup cluster included in the database based on receiving requests from ones of the plurality of host computers. These host computers are client host computers 182 included in a client service 180, for example In some embodiments, the database is a key-value database while the computer system is a distributed micro-service acting as a data access layer (DAL) for the key-value database. In some embodiments, the computer system includes a pool of access host computers configured to maintain a plurality of connections to the database. In some embodiments, the changeover decision includes health ballots for clusters of the key-value database and these health ballots specify for respective clusters in the database: a name of an access host computer as an entry in the key field and a timestamp and health vote as an entry in the value field.

FIG. 5 is a flow diagram illustrating a method for generating health information usable to determine whether to switch from accessing a set of active database clusters to accessing a set of backup database clusters, according to some embodiments. The method shown in FIG. 5 may be used in conjunction with any of the computer circuitry, systems, devices, elements, or components disclosed herein, among other devices. For example, one of access host computers 122 may perform the method shown in FIG. 5. In various embodiments, some of the method elements shown may be performed concurrently, in a different order than shown, or may be omitted. Additional method elements may also be performed as desired.

At 510, in the illustrated embodiment, a host computer accesses data stored in a database implemented using a plurality of clusters. The plurality of requests may include database operations, such as data manipulation operations.

At 520, the host computer receives, from the database, responses indicating whether accessing data stored in the clusters of the database was successful. These responses may include an indication of success, failure, or timeout. In addition, these responses may include data retrieved from an active cluster of the database.

At 530, the access host computer determines, based on the responses, health values for respective database accesses, where the health values are usable by a gateway device to generate health information for ones of the plurality of clusters, where the health information is usable by one or more access host computers maintained by the gateway device to determine whether to switch from accessing an active cluster of the database to accessing. In some embodiments, the determining includes calculating, based on the health values, a failure ratio for one or more clusters in the database. In some embodiments, calculating the failure ratio includes dividing a total number of timeout and failure health values by a total number of determined health values.

In some embodiments, the access host computer accesses a changeover decision stored by the gateway device, where the changeover decision is generated by the gateway device based on the health information. In some embodiments, the access host computer switches, based on the changeover decision, database accesses from an active cluster to a backup cluster implemented by the database.

Example Computing Device

Figure 6:
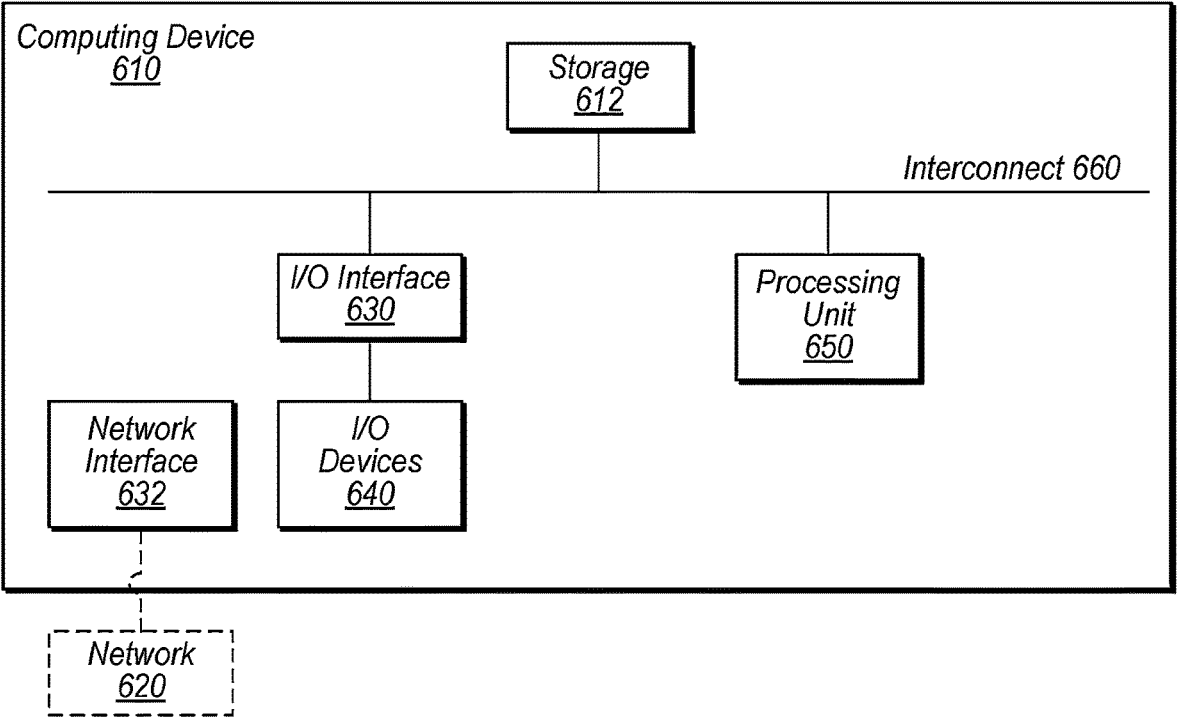
FIG. 6 is a block diagram illustrating an example computing device, according to some embodiments.

Turning now to FIG. 6, a block diagram of one embodiment of computing device (which may also be referred to as a computing system) 610 is depicted. Computing device 610 may be used to implement various portions of this disclosure. Computing device 610 may be any suitable type of device, including, but not limited to, a personal computer system, desktop computer, laptop or notebook computer, mainframe computer system, web server, workstation, or network computer. As shown, computing device 610 includes processing unit 650, storage 612, and input/output (I/O) interface 630 coupled via an interconnect 660 (e.g., a system bus). I/O interface 630 may be coupled to one or more I/O devices 640. Computing device 610 further includes network interface 632, which may be coupled to network 620 for communications with, for example, other computing devices.

In various embodiments, processing unit 650 includes one or more processors. In some embodiments, processing unit 650 includes one or more coprocessor units. In some embodiments, multiple instances of processing unit 650 may be coupled to interconnect 660. Processing unit 650 (or each processor within 650) may contain a cache or other form of on-board memory. In some embodiments, processing unit 650 may be implemented as a general-purpose processing unit, and in other embodiments it may be implemented as a special purpose processing unit (e.g., an ASIC). In general, computing device 610 is not limited to any particular type of processing unit or processor subsystem.

Storage subsystem 612 is usable by processing unit 650 (e.g., to store instructions executable by and data used by processing unit 650). Storage subsystem 612 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 612 may consist solely of volatile memory, in one embodiment. Storage subsystem 612 may store program instructions executable by computing device 610 using processing unit 650, including program instructions executable to cause computing device 610 to implement the various techniques disclosed herein.

I/O interface 630 may represent one or more interfaces and may be any of various types of interfaces configured to couple to and communicate with other devices, according to various embodiments. In one embodiment, I/O interface 630 is a bridge chip from a front-side to one or more back-side buses. I/O interface 630 may be coupled to one or more I/O devices 640 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated, including the following: Claim 3 (could depend from any of claims 1-2); claim 4 (any preceding claim); claim 5 (claim 4), etc. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. A non-transitory computer-readable medium having instructions stored thereon that are executable by an intermediary device to perform operations comprising:

determining, based on health information for one or more clusters of a database storing application data in a plurality of clusters, whether to switch from accessing an active cluster to accessing a backup cluster of the database;

storing, in multiple clusters of the database, a changeover decision generated based on determining whether to switch from the active cluster to the backup cluster, wherein said storage of the changeover decision provides availability of the changeover decision when one or more clusters of the database are down;

periodically receiving, from host computers included in a pool of host computers configured to respond to a plurality of requests to access the data stored in the database, updated health information, wherein the updated health information is generated based on changes in real-time traffic for the database; and updating, based on the updated health information, the changeover decision.

2. The non-transitory computer-readable medium of claim 1, wherein the application data is for communications initiated between applications of two or more computing devices prior to determining the health information, and wherein accessing the application data is based on:

receiving, from host computers in the pool of host computers, a plurality of requests to access the application data stored in the database; and responding, by accessing application data stored in the active cluster, to the plurality of requests.

3. The non-transitory computer-readable medium of claim 1, wherein the updated health information indicates whether one or more clusters in the database are healthy, and wherein the updated health information is received every second.

4. The non-transitory computer-readable medium of claim 1, wherein determining the health information includes determining whether one or more database accesses were successful, wherein the health information indicates inferior characteristics of the active cluster.

5. The non-transitory computer-readable medium of claim 1, wherein the health information is further generated by:

determining whether failure ratios for one or more clusters in the database, calculated based on health values for a plurality of requests for application data, satisfy a health threshold.

6. The non-transitory computer-readable medium of claim 1, wherein the stored changeover decision is accessible to host computers in the pool of host computers for determining whether to access the active cluster or the backup cluster included in the database based on receiving requests, received from one or more client host computers, requesting to access the database, wherein the stored changeover decision includes state votes that specify for respective clusters in the database:

a name of a host computer in the pool of host computers; and a timestamp and a health vote.

7. The non-transitory computer-readable medium of claim 1, wherein the intermediary device is a distributed microservice acting as a data access layer (DAL) for the database, wherein the intermediary device includes the pool of host computers, and wherein the pool of host computers maintain a plurality of connections to the database.

8. A method, comprising:

determining, by a computer system based on state information for one or more clusters of a database storing data in a plurality of clusters, whether to switch from accessing an active cluster of the database to accessing a backup cluster;

storing, by the computer system in multiple clusters of the database, a changeover decision generated based on determining whether to switch from the active cluster to the backup cluster;

periodically receiving, by the computer system from host computers included in a pool of host computers configured to respond to a plurality of requests to access data stored in the database, updated state information; and updating, by the computer system based on the updated state information, the changeover decision.

9. The method of claim 8, further comprising:

removing, by the computer system from the state information, one or more state votes associated with one or more host computers that have been removed from the pool of host computers used in responding to the plurality of requests.

10. The method of claim 8, wherein the updated state information is received every minute.

11. The method of claim 9, wherein the database is a non-relational database, and wherein respective clusters in the database store copies of the same data.

12. The method of claim 9, wherein the changeover decision includes state votes that specify for respective clusters in the database:

a name of a host computer in the pool of host computers; and a timestamp and a cluster status.

13. The method of claim 9, wherein the computer system facilitates communication between a plurality of client host computers and the database.

14. A system, comprising:

a processor; and a non-transitory computer-readable medium having stored thereon instructions that are executable by the processor to cause the system to perform operations comprising:

determining, based on status information for one or more clusters of a database storing data in a plurality of clusters, whether to switch from accessing an active cluster of the database to accessing a backup cluster;

storing, in multiple clusters of the database, a changeover decision generated based on determining whether to switch from the active cluster to the backup cluster, wherein redundant storage of the changeover decision improves database downtimes;

periodically receiving, from host computers included in a pool of host computers configured to respond to requests to access the data stored in the database, updated status information; and updating, based on the updated status information, the changeover decision.

15. The system of claim 14, wherein the instructions are executable by the processor to cause the system to further perform operations comprising:

removing, from the status information based on determining that one or more host computers in the pool of host computers are no longer active, information associated with the one or more host computers that are no longer active.

16. The system of claim 15, wherein the removing includes:

removing one or more status ballots associated with one or more host computers in the pool of host computers that are no longer active.

17. The system of claim 14, wherein the changeover decision includes status ballots that specify for respective clusters in the database:

a name of a host computer in the pool of host computers; and a timestamp and a health vote.

18. The system of claim 14, wherein the status information is generated by host computers in the pool of host computers by:

determining, based on success of one or more database accesses, status values for respective database accesses; and calculating, based on the status values, failure ratios for one or more clusters in the database, wherein calculating the failure ratios includes dividing a total number of timeout and failure status values by a total number of determined status values.

19. The system of claim 18, wherein the changeover decision is read by one or more host computers in the pool of host computers from the database based on executing a switch action thread.

20. The system of claim 14, wherein one or more host computers in the pool of host computers execute a switch action thread every ten seconds.

* * * * *